United States Patent
Lair et al.

(10) Patent No.: US 7,127,880 B2
(45) Date of Patent: Oct. 31, 2006

(54) INDUCTION COUPLED VARIABLE NOZZLE

(75) Inventors: Jean-Pierre Lair, San Antonio, TX (US); Gregory Thomas Wolters, Talala, OK (US)

(73) Assignee: The Nordam Group, Inc., Tulsa, OK (US)

( * ) Notice: Subject to any disclaimer, the term of this patent is extended or adjusted under 35 U.S.C. 154(b) by 106 days.

(21) Appl. No.: 10/919,110

(22) Filed: Aug. 16, 2004

(65) Prior Publication Data

US 2005/0086927 A1   Apr. 28, 2005

Related U.S. Application Data

(60) Provisional application No. 60/498,850, filed on Aug. 29, 2003.

(51) Int. Cl.
F02K 3/02 (2006.01)
B05B 12/00 (2006.01)
B63H 11/00 (2006.01)

(52) U.S. Cl. .................. 60/204; 60/226.2; 60/242; 239/265.25

(58) Field of Classification Search .............. 60/204, 60/242, 226.2, 770, 771; 239/265.25, 265; 244/110 B
See application file for complete search history.

(56) References Cited

U.S. PATENT DOCUMENTS

| | | | |
|---|---|---|---|
| 3,779,010 A | 12/1973 | Chamay et al. | |
| 3,820,719 A | 6/1974 | Clark | |
| 4,291,782 A | 9/1981 | Klees | |
| 4,922,712 A | 5/1990 | Matta et al. | |
| 4,922,713 A | 5/1990 | Barbarin et al. | |
| 5,181,676 A | 1/1993 | Lair | |
| 5,221,048 A | 6/1993 | Lair | |
| 5,655,360 A | 8/1997 | Butler | |
| 5,694,767 A | 12/1997 | Vdoviak et al. | |
| 5,778,659 A | 7/1998 | Duesier et al. | |
| 5,779,192 A | 7/1998 | Metezeau et al. | |
| 5,794,434 A * | 8/1998 | Szupkay | 60/226.2 |
| 5,819,527 A | 10/1998 | Fournier | |
| 5,826,823 A | 10/1998 | Lymons et al. | |
| 5,853,148 A | 12/1998 | Standish et al. | |
| 5,863,014 A | 1/1999 | Standish | |
| 5,875,995 A | 3/1999 | Moe et al. | |
| 5,913,476 A | 6/1999 | Gonidec et al. | |
| 5,934,613 A | 8/1999 | Standish et al. | |
| 6,070,407 A | 6/2000 | Newton | |
| 6,101,807 A | 8/2000 | Goindec et al. | |
| 6,568,172 B1 * | 5/2003 | Jannetta et al. | 60/226.2 |
| 6,655,125 B1 * | 12/2003 | Johnson et al. | 60/226.2 |
| 6,751,944 B1 | 6/2004 | Lair | |
| 6,771,032 B1 * | 8/2004 | Cox-Smith et al. | 318/85 |

OTHER PUBLICATIONS

J. Lair, U.S. patent application, "Variable Cam Exhaust Nozzle," U.S. Appl. No. 10/899,247, filed Jul. 26, 2004.

* cited by examiner

Primary Examiner—Charles G. Freay
(74) Attorney, Agent, or Firm—Francis L. Conte (57) ABSTRACT

A turbofan nacelle includes forward and aft cowls adjoining at a joint, and including an exhaust duct having a main outlet for discharging exhaust. A variable nozzle surrounds the exhaust duct and includes a secondary outlet around the main outlet. A thrust reverser bridges the forward and aft cowls upstream from the variable nozzle. The variable nozzle is inductively powered and controlled across the closed joint, and is uncoupled inductively from the forward cowl when the joint is open.

27 Claims, 5 Drawing Sheets

INDUCTION COUPLED VARIABLE NOZZLE

This application claims the benefit of U.S. Provisional Application No. 60/498,850 filed Aug. 29, 2003.

BACKGROUND OF THE INVENTION

The present invention relates generally to turbofan aircraft engines, and, more specifically, to exhaust nozzles therefor.

A typical turbofan aircraft engine includes a fan powered by a core engine. The core engine includes a surrounding cowl or nacelle, and the fan includes a corresponding cowl or nacelle at the forward end of the core engine which extends aft either in part or fully thereover.

The fan nacelle is spaced radially outwardly from the core nacelle to define an annular bypass duct therebetween. During operation, the core engine powers the fan which pressurizes ambient air to produce propulsion thrust in the fan air bypassing the core engine and discharged from the fan exhaust nozzle.

A portion of the fan air is channeled into the core engine wherein it is pressurized and mixed with fuel for generating hot combustion gases. Energy is extracted from the combustion gases in high and low pressure turbines which in turn power a compressor and the fan. The core exhaust gases are discharged from the core engine through a core exhaust nozzle and provide additional thrust for propelling the aircraft in flight.

In a typical short fan nacelle, the fan nozzle is spaced upstream from the core nozzle, and the fan exhaust is discharged separately from and surrounding the core exhaust. In a long nacelle, the fan nacelle extends aft of the core nozzle to provide a single common nozzle through which both the fan bypass air and core exhaust are discharged from the engine.

The fan nozzle and the core nozzle are typically fixed area nozzles, although they could be configured as variable area nozzles. Variable area nozzles permit adjustment of the aerodynamic performance of the engine which correspondingly increases complexity, weight, and cost of the nozzle.

Furthermore, turbofan aircraft engines typically include thrust reversers for use in providing braking thrust during landing of the aircraft. Various types of thrust reversers are found in the engine nacelle and further increase complexity, weight, and cost of the engine.

In U.S. Pat. No. 6,751,944; and entitled "Confluent Variable Exhaust Nozzle," assigned to the present assignee, and incorporated herein by reference, an improved variable area exhaust nozzle is disclosed for a turbofan aircraft engine. The confluent nozzle includes outer and inner conduits, with a plurality of flaps therebetween. The flaps may be selectively opened to bypass a portion of exhaust flow from the inner conduit through the outer conduit in confluent exhaust streams from concentric main and auxiliary exhaust outlets.

In this way, the auxiliary outlet may be operated during takeoff operation of the aircraft for temporarily increasing exhaust flow area for correspondingly reducing velocity of the exhaust flow. Noise may therefore be reduced during takeoff operation using a relatively simple and compact variable area configuration.

However, the typical thrust reverser includes thrust reversing cascade vanes mounted at the axial splitline or joint between a fixed forward cowl and a translating aft cowl. A main actuator deploys aft the aft cowl during landing for reversing exhaust thrust and braking the aircraft on the runway.

The variable exhaust nozzle is mounted in the aft cowl and includes a secondary actuator for controlling its operation during engine takeoff. Whereas the variable nozzle operates during aircraft flight with the aft cowl retracted, the thrust reverser operates only during landing with the aft cowl deployed.

Deployment of the aft cowl opens the joint with the forward cowl to expose the cascade vanes, and would therefore require sufficient length and slack in the power and electrical control lines for the variable nozzle. The power and control connections to the variable nozzle must be sufficiently durable and redundant for long life, which would therefore increase the complexity and cost thereof for bridging the intercowl joint during the repeated opening and closing thereof required every time the aircraft lands.

Accordingly, it is desired to provide an improved power and control system for the variable area exhaust nozzle in a turbofan aircraft engine having a thrust reverser therein.

BRIEF SUMMARY OF THE INVENTION

A turbofan nacelle includes forward and aft cowls adjoining at a joint, and including an exhaust duct having a main outlet for discharging exhaust. A variable nozzle surrounds the exhaust duct and includes a secondary outlet around the main outlet. A thrust reverser bridges the forward and aft cowls upstream from the variable nozzle. The variable nozzle is inductively powered and controlled across the closed joint, and is uncoupled inductively from the forward cowl when the joint is open.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
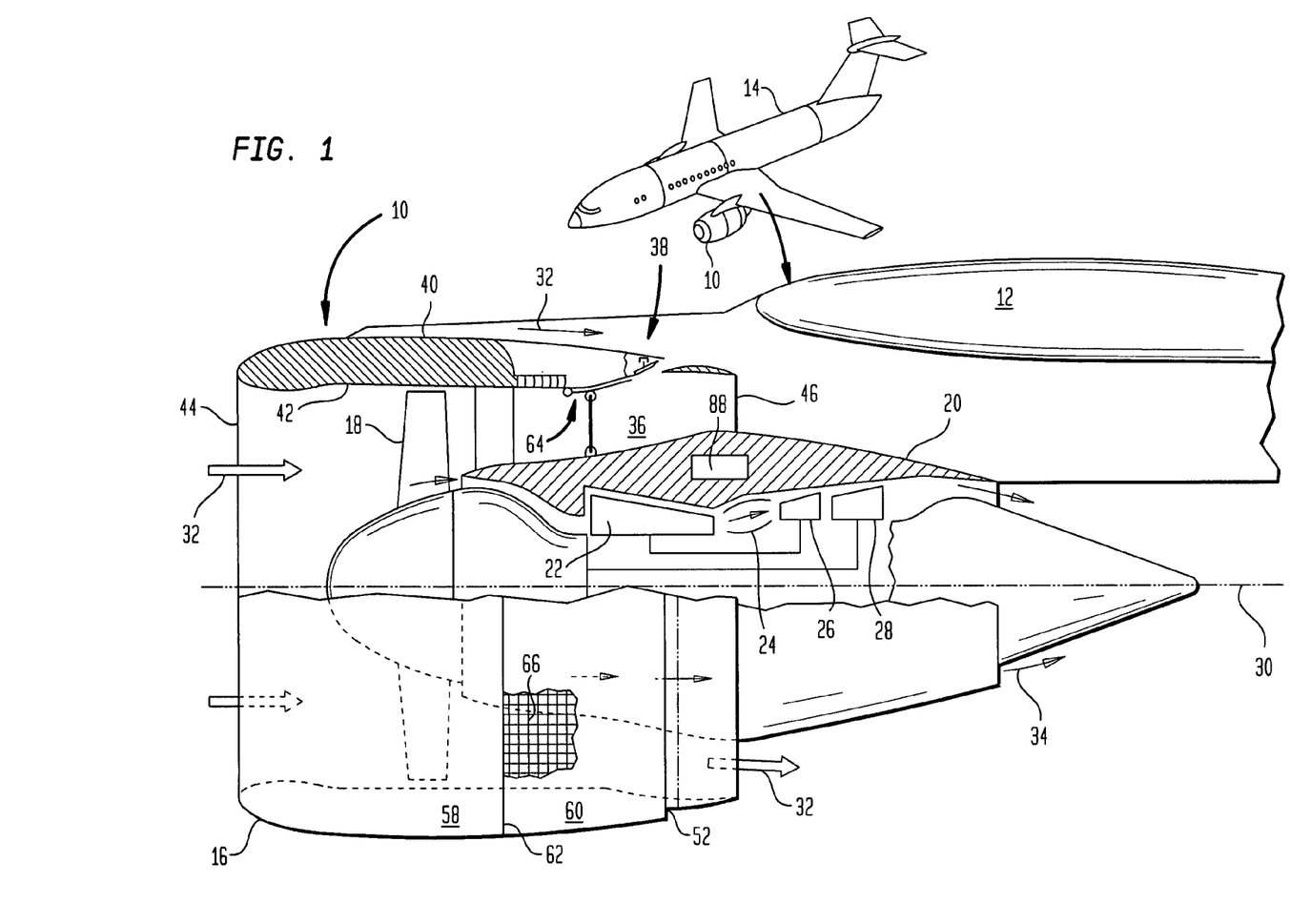
FIG. 1 is a partly sectional axial view of an exemplary turbofan aircraft gas turbine engine mounted to the wing of an aircraft and including a variable exhaust nozzle and thrust reverser.

Illustrated in FIG. 1 is a turbofan aircraft gas turbine engine 10 suitably mounted to the wing 12 of an aircraft 14 by a supporting pylon. Alternatively, the engine could be mounted to the fuselage of the aircraft if desired.

The engine includes an annular fan nacelle 16 surrounding a fan 18 which is powered by a core engine surrounded by a core nacelle or cowl 20. The core engine includes in serial flow communication a multistage axial compressor 22, an annular combustor 24, a high pressure turbine 26, and a low pressure turbine 28 which are axisymmetrical about a longitudinal or axial centerline axis 30.

During operation, ambient air 32 enters the fan nacelle and flows past the fan blades into the compressor 22 for pressurization. The compressed air is mixed with fuel in the combustor 24 for generating hot combustion gases 34 which are discharged through the high and low pressure turbine 26,28 in turn. The turbines extract energy from the combustion gases and power the compressor 22 and fan 18, respectively.

A majority of air is pressurized by the driven fan 18 and bypasses the core engine through a substantially annular bypass duct 36 which terminates in a variable exhaust nozzle (VEN) 38 for producing a substantial portion of the propulsion thrust which powers the aircraft in flight. The combustion gases 34 are exhausted from the aft outlet of the core engine for providing additional thrust.

The fan nacelle includes radially outer and inner cowlings or skins 40,42 which extend axially from a leading edge of the nacelle defining an annular inlet 44 to an opposite trailing edge defining an annular main outlet 46. The fan nacelle may have any conventional configuration, and is typically formed in two generally C-shaped halves which are pivotally joined to the supporting pylon for being opened during maintenance operation.

The exemplary fan nacelle illustrated in FIG. 1 is a short nacelle terminating near the middle of the core engine for discharging the pressurized fan airflow separately from and surrounding the exhaust flow 34 discharged from the aft outlet of the core engine. In alternate embodiments, the fan nacelle could be long and extend downstream of the core engine for providing a single, common outlet for both the fan air and the core exhaust.

The variable nozzle 38 illustrated in FIG. 1 is configured for variable area performance for reducing exhaust noise during aircraft takeoff operation. The variable nozzle 38 is illustrated in more detail in FIGS. 2 and 3 and includes the aft portion of the bypass duct 36 which defines an inner duct within the fan nacelle having the main outlet 46 at the aft end thereof. Spaced upstream from the main outlet 46 is a row of circumferentially spaced apart, radial inlet apertures 48.

Figure 2:
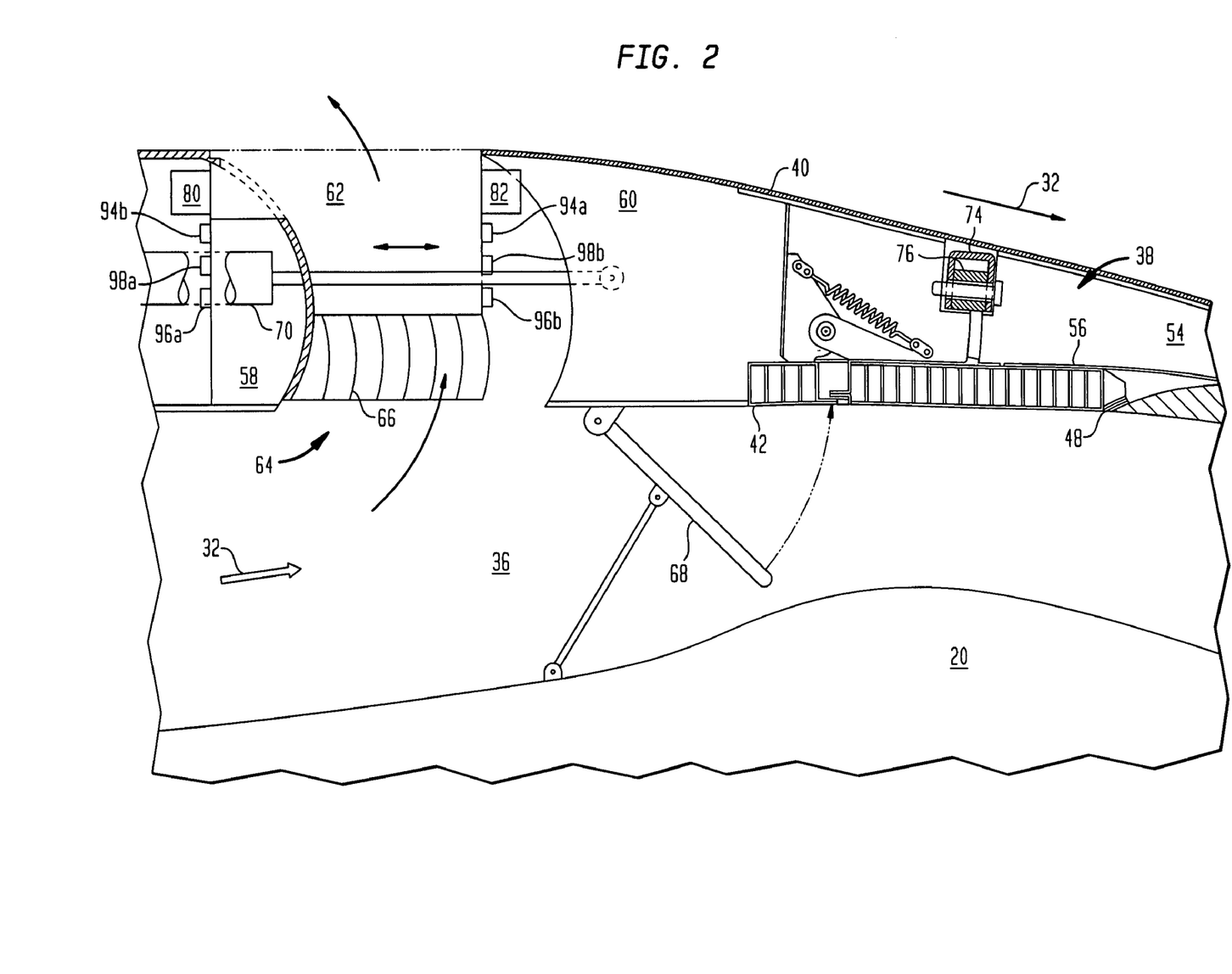
FIG. 2 is a partly sectional axial view through the fan nozzle shown in FIG. 1 and illustrates deployment of a cascade thrust reverser, with a variable area exhaust nozzle having closed flaps.
Figure 3:
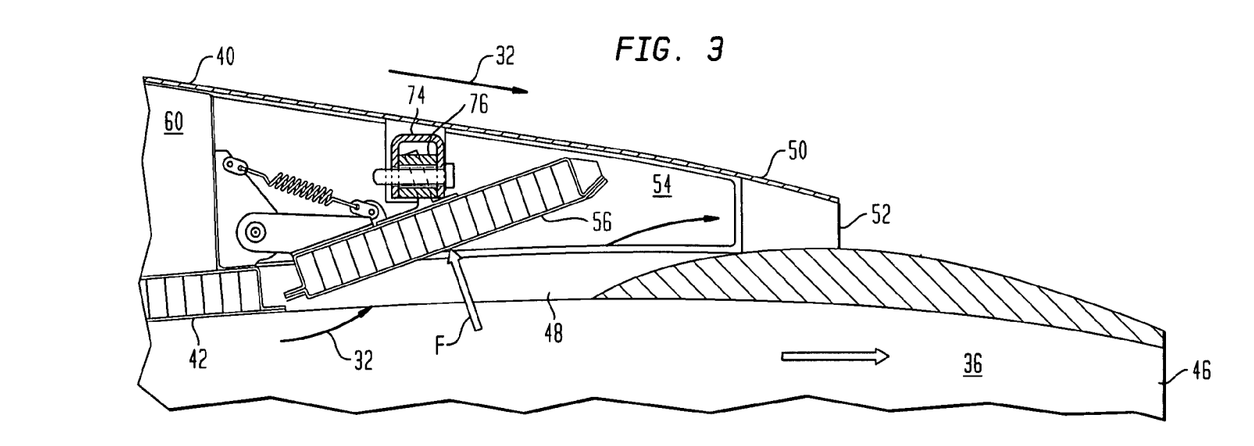
FIG. 3 is a partly sectional axial view, like FIG. 2, illustrating an exemplary flap of the variable nozzle being open.

An annular outer duct 50 is disposed at the aft end of the fan nacelle coextensive with the outer skin 40 for maintaining an aerodynamically smooth outer mold line (OML) or outer surface of the nacelle having minimal aerodynamic drag. A secondary outlet 52 is disposed at the aft end of the outer duct concentric about the fan bypass duct 36.

The outer duct 50 is spaced radially outwardly from and surrounds the inner duct 36 over the row of apertures 48 to form a bypass channel 54 which begins at the apertures 48 and terminates at the outlet 52. A plurality of doors or flaps 56 are hinged at upstream ends thereof to selectively cover and uncover corresponding ones of the apertures 48 and selectively bypass a portion of the exhaust flow 32 from the inner duct 36 through the outer duct 50 in confluent streams from both the main and secondary outlets 46,52.

In this way, the secondary outlet 52 provides a temporary increase in the overall discharge flow area for the fan bypass air 32 specifically during takeoff operation of the aircraft. The increased flow area of the main and auxiliary outlets temporarily reduces the velocity of the fan exhaust and therefore reduces the associated noise therefrom.

FIG. 2 illustrates the flaps 56 closed in their respective apertures 48 during aircraft landing and thrust reverse operation. During flight, the flaps are also closed, with the entirety of the fan exhaust 32 being discharged through the inner duct 36 and the main outlet 46 at the aft end thereof. FIG. 3 illustrates the open flaps 56 for bypassing a portion of the fan exhaust 32 from the inner duct 36 through the outer duct 50 during takeoff operation.

Figure 4:
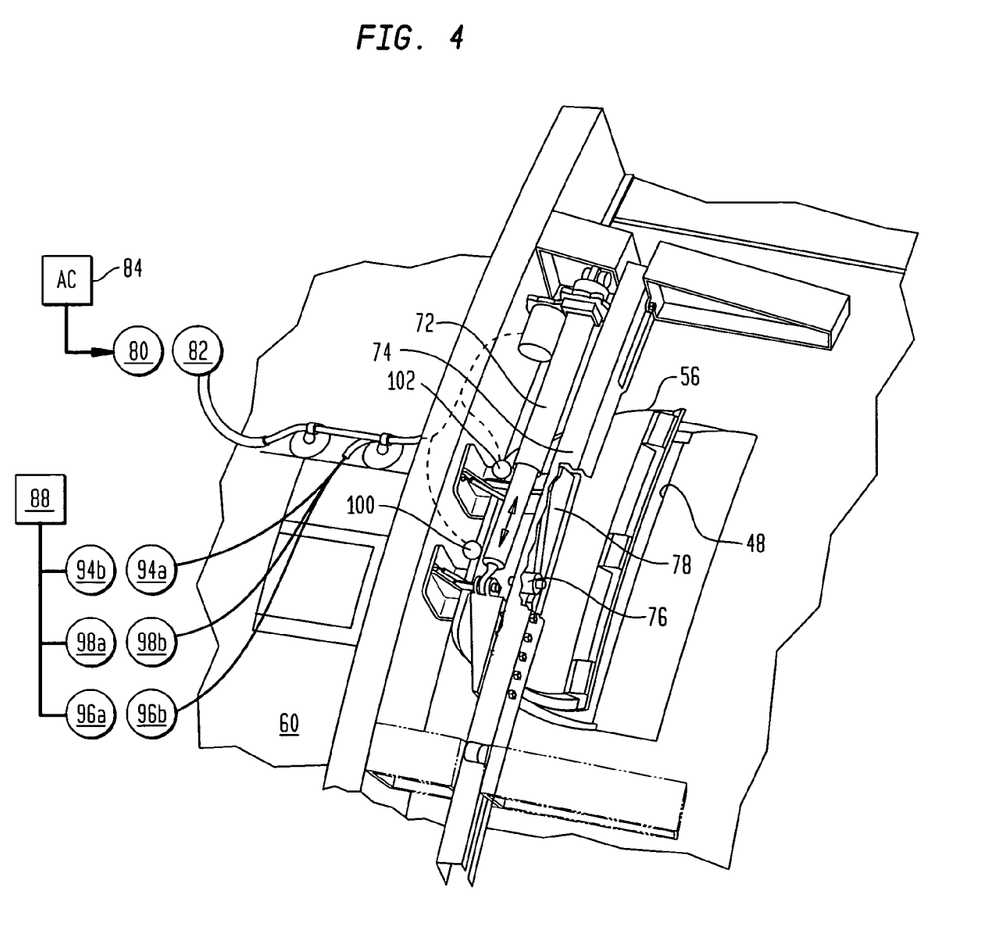
FIG. 4 is an isometric view of the open flaps illustrated in FIG. 3 with portions of the actuation mechanism and control system therefor.

As illustrated in FIG. 4, the variable nozzle preferably includes a radial frame which extends circumferentially between the outer and inner ducts immediately forward of the row of apertures 48. The individual flaps 56 are suitably hinged at their upstream ends to the radial flame. A plurality of longitudinal frames extend axially rearwardly from the radial frame, and are disposed circumferentially between corresponding ones of the apertures 48. The longitudinal frames are tapered thinner in the aft direction to match the contour of the outer duct 50 which converges in the aft direction.

The radial and longitudinal frames cooperate together to provide structural support for introduction of the row of apertures 48, while supporting the outer duct 50 and the row of flaps. The longitudinal frames are preferably imperforate to prevent crossflow between the circumferentially adjacent apertures 48 and to confine exhaust flow rearwardly through the corresponding bypass channels 54 disposed between the row of longitudinal frames.

As best illustrated in FIGS. 2 and 3, each of the flaps 56 is pivotally joined at forward ends thereof to the radial frame by a pair of circumferentially spaced hinges. The hinges may have any suitable configuration such as devises fixedly mounted to the radial frame and rotatably joined to flanges extending from the outer surface of the flaps, with hinge pins or bolts therebetween.

The flaps of the variable nozzle illustrated in the several Figures may be selectively opened and closed in various manners. However, since the variable nozzle is disposed at the aft end of the fan nacelle, its configuration is affected by the introduction of the typical fan reverser commonly found in the aircraft turbofan engines.

More specifically, the fan nacelle illustrated in FIGS. 1 and 2 includes a fixed or stationary forward cowl 58 which adjoins a moveable aft cowl 60 at an axial splitline or joint 62 which extends circumferentially around the extent of the fan nacelle. The bypass duct 36 is located inside the aft cowl and extends forward in part inside the forward cowl.

The variable nozzle 38 illustrated in FIG. 2 is disposed in the aft cowl 60, with the row of flaps 56 being suitably mounted therein.

A thrust reverser 64 as shown in FIGS. 1 and 2 is suitably mounted to the forward cowl for bridging the joint 62 between the forward and aft cowls upstream from the variable nozzle 38. The thrust reverser may have any conventional configuration and typically includes a grid of cascade turning vanes 66 fixedly mounted to the forward cowl 58 at the joint 62 with the aft cowl 60.

A row of blocker doors 68 are pivotally mounted to the aft cowl 60, and to the core cowl 20 by corresponding drag links, for deploying radially inwardly when the aft cowl is translated aft to open the joint 62 and expose the cascade vanes 66 for thrust reversal of the exhaust 32 from the bypass duct 36.

As shown in FIG. 2, a main actuator 70 is suitably mounted in the forward cowl 58 and is fixedly joined to the aft cowl 60 for selectively extending aft the aft cowl to open the joint 62 and expose the vanes of the thrust reverser. The actuator is also configured for retracting forward the aft cowl to close the joint 62 and cover the vanes of the thrust reverser. The main actuator may have any conventional configuration, and may be electrically, hydraulically, or pneumatically powered for example.

As shown in FIG. 4, a secondary actuator 72 is suitably mounted in the aft cowl 60 to adjust the variable nozzle 38 and selectively bypass exhaust from the duct 36 to the secondary outlet 52 through the open apertures 48.

The secondary actuator 72 may have any conventional configuration, and is preferably in the form of an electrical actuator driven by an electrical motor to extend and retract a corresponding output rod thereof. The secondary actuator 72 may be operatively joined to the several flaps 56 by various synchronizing means or deployment linkage for opening and closing the flaps simultaneously when desired.

In one embodiment of the deployment linkage, an arcuate unison bar 74 is mounted circumferentially around the bypass duct on supporting rollers, and is suitably joined to the distal end of the output rod of the secondary actuator 72 by a bracket. In this way, extension and retraction of the output rod by the secondary actuator rotates the unison bar 74 in opposite counterclockwise and clockwise directions.

The deployment linkage includes a plurality of cam rollers or followers 76 mounted inside the generally U-shaped unison bar 74 and spaced circumferentially apart therein to engage corresponding cams 78 affixed to the top of the respective flaps 56 as illustrated in FIGS. 2–5.

As shown in FIG. 4, the output rod of the secondary actuator 72 is suitably joined to the unison bar 74 for selectively rotating the bar in a first direction to pivot open the flaps 56, as additionally illustrated in FIG. 3, and in an opposite second direction to pivot closed the flaps to cover the apertures 48, as additionally illustrated in FIG. 2.

In this way, the common unison bar 74 may be used to selectively open and close the full row of flaps 56 and selectively permit an increase in discharge flow area as a portion of the air 32 initially carried in the large bypass duct 36 is diverted therefrom through the small bypass channel 54 and out the auxiliary outlet 52 when desired.

Particular advantages of the actuation mechanism for opening and closing the flaps are its mechanical simplicity, mechanical efficiency, lower actuation force, few parts, and low weight which are all desirable in an aircraft engine. A separate unison bar and actuator may be provided for each half of the engine to correspond with the C-ducts thereof.

Figure 5:
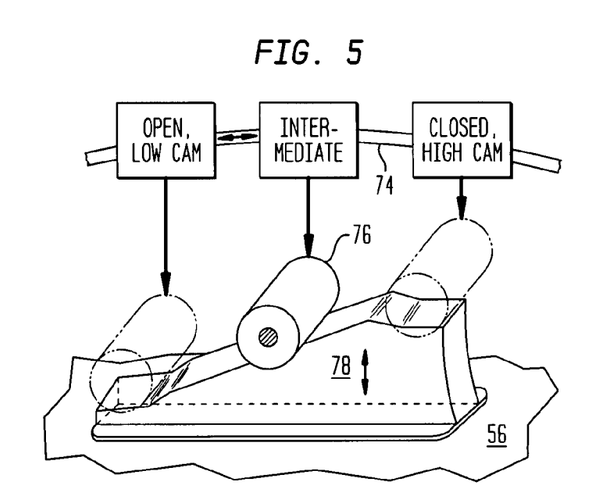
FIG. 5 is a schematic view of an exemplary deployment cam affixed to the flaps illustrated in FIGS. 2 and 3 and driven by a unison bar to selectively open and close the flaps of the variable nozzle when desired.

As illustrated in FIGS. 4 and 5, each of the cams 78 includes a radially outer land or ramp which extends circumferentially along the outer surface of each flap 56. The outer ramp varies in radial height from low to high. The low cam height is defined by a low step or land at the base of the ramp, and the high cam height is defined at a high step or land at the opposite top end of the ramp.

When the unison bar 74 is driven counterclockwise by the actuator to position the cam followers 76 on the low step of the cam 78, the corresponding flaps 56 are permitted to pivot radially outwardly into their open positions as shown in FIG. 3. Since the fan bypass air 32 being channeled through the fan duct 36 is pressurized, it develops a pressure force F over the inner surface of the flaps 56 which pushes the flaps radially outwardly as the cam followers are driven towards the low cam steps.

Correspondingly, when the unison bar is rotated clockwise by the secondary actuator, the cam followers 76 are driven along the ramp to the high step of the cam 78 which pushes radially inwardly the corresponding flaps to their closed positions sealing shut the radial apertures 48.

Furthermore, the unison bar may be driven to position the cam followers at any intermediate position between the low and high steps, which in turn positions the flaps 56 to the corresponding intermediate positions between the open position illustrated in FIG. 3 and the closed position illustrated in FIG. 2. Variable area performance of the fan nozzle may be effected in this manner.

In the exemplary embodiment illustrated in FIGS. 2 and 3, a plurality of tension springs may be mounted between respective ones of the flaps 56, at each of their two hinges for example, and the radial frame to pull the flaps radially outwardly. In this way, the flaps may be open by the tension force developed in the springs upon rotation of the unison bar independently of the pressure forces F developed during operation of the engine.

Since the main actuator 70 as illustrated in FIG. 2 is fixedly mounted in the stationary forward cowl 58, the corresponding power and control connections thereto may also be fixedly mounted in the forward cowl for withstanding the hostile vibratory environment in an operating gas turbine engine. However, the secondary actuator 72 as illustrated in FIG. 4 is fixedly joined to the aft cowl 60 and therefore moves with that cowl when it is translated aft by the main actuator 70 as illustrated in FIG. 2 for thrust reverse operation.

In order to power and control the secondary actuator 72 in a conventional manner, corresponding electrical power and control lines would be required with suitable slack therein for bridging the open joint 62 upon deployment of the aft cowl 60 during thrust reverse operation. However, such slack in the power and control lines would increase the complexity of integrating the variable nozzle, and would require suitable containment of the slack lines for withstanding the hostile vibratory environment of the operating engine.

In accordance with the present invention, physical interconnections of the power and control lines for the variable nozzle at the joint 62 are eliminated for eliminating the potential slack problem, and replaced instead by suitable means for inductively powering and controlling the secondary actuator 72 of the variable nozzle 38 only when the joint 62 is closed. The inductive powering and controlling means are physically or spatially interrupted when the joint 62 is open, which inductively uncouples the variable nozzle 38 from its power source in the forward cowl 58 to operate the thrust reverser 64 without operating the variable nozzle 38.

Figure 6:
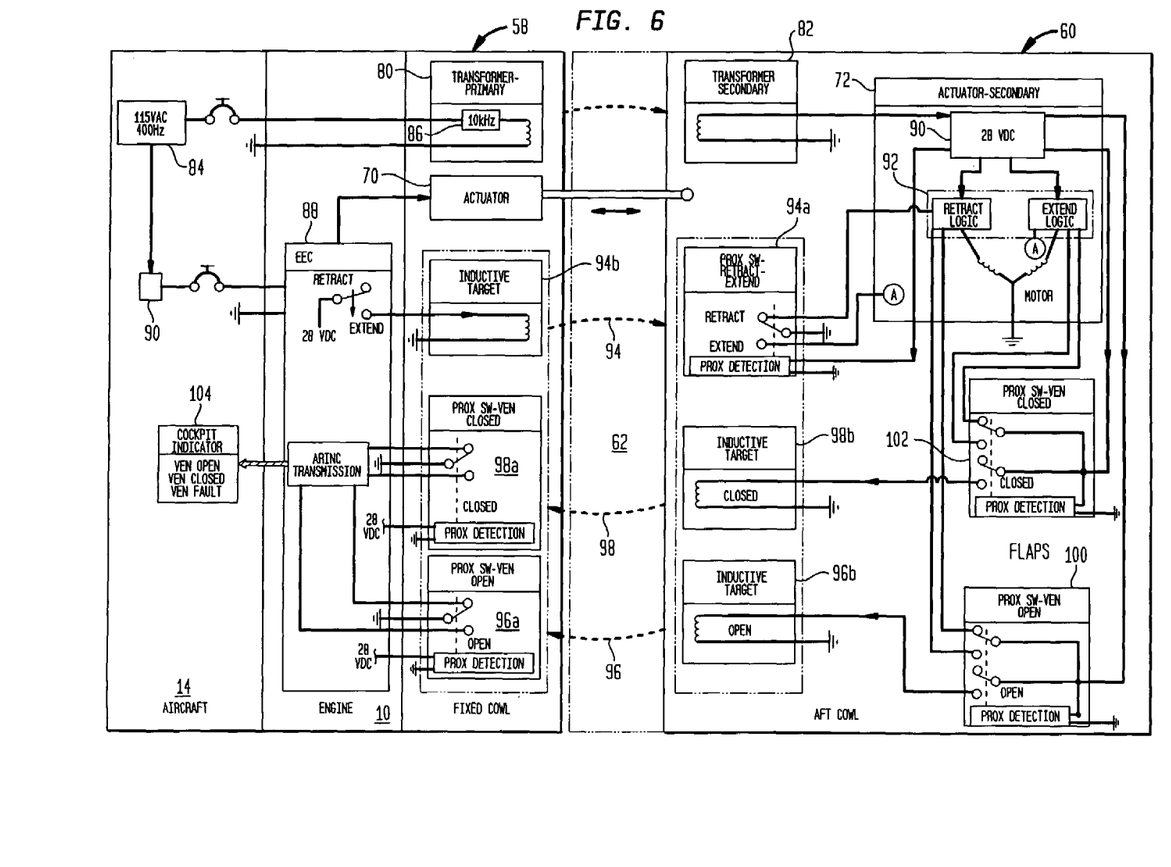
FIG. 6 is a schematic view of the power and control system for operating the variable nozzle illustrated in the previous Figures.

More specifically, FIGS. 2, 4, and 6 illustrate schematically a pair of primary and secondary electrical transformer coils 80,82 suitably mounted at the splitline or joint 62 for inductively transmitting electrical power from the stationary forward cowl to the movable aft cowl to power the variable nozzle. The primary coil 80 is suitably mounted in the forward cowl 58 at the joint 62, with the secondary coil 82 being suitably mounted in the aft cowl 60 also at the joint 62 directly adjacent to and in alignment with the primary coil 80 with a minimum spacing or gap therebetween for inductively receiving power from the primary coil when energized. In this way, sufficient electrical power may be transmitted between the primary and secondary coils which cooperate in the manner of an electrical transformer to power the secondary actuator 72 of the variable nozzle.

The two coils 80,82 each include respective windings which are closely coupled together when the joint 62 is closed for inductively or magnetically transmitting electrical power therebetween. When the thrust reverser is activated and the aft cowl 60 is deployed aft, the joint 62 is open to expose the cascade vanes 66 with the axial spacing between the two coils being sufficiently large to interrupt and prevent any inductive coupling therebetween or power transfer to the secondary actuator. In this way, the variable nozzle may only be powered when the aft cowl 60 is stowed in abutting contact with the forward cowl, and not when the joint is open to operate the thrust reverser.

The aircraft 14 illustrated in FIG. 1 includes a conventional alternating current (AC) electrical generator 84 as shown in FIGS. 4 and 6 for generating AC voltage of about 115 VAC at a first frequency of about 400 Hz. Power from the generator is distributed throughout the aircraft and engine as required using suitable electrical lines, buses, and circuit breakers, with one line providing power to the primary coil 80.

A conventional frequency converter 86 joins the generator to the primary coil, and is configured for increasing the frequency of the voltage to a second frequency of about 10 khz which is substantially greater than the original frequency. In this way, the high frequency AC voltage carried through the primary coil may be transmitted inductively to the secondary coil 82 with a substantial increase in transmission efficiency.

The secondary coil 82 is operatively joined to the secondary actuator 72 for providing electrical power thereto. The variable nozzle thusly has a power source only when the intercowl joint 62 is closed, and not open.

The gas turbine engine illustrated in FIGS. 1 and 6 includes a conventional electrical controller 88, such as an electronic engine controller (EEC) for controlling the various components of the engine, including the thrust reverser and variable nozzle.

For example, the controller 88 is operatively joined to the main actuator 70 for selectively extending and retracting the aft cowl 60 for deploying and stowing the thrust reverser 64. Similar power supplies 90 may be provided for the controller 88 and the secondary actuator 72 for converting the AC voltage to a suitable direct current (DC) voltage of about 28 VDC, which is common in aircraft engines.

The secondary actuator 72 illustrated schematically in FIG. 6 is conventional in configuration and operation and includes an electrical motor configured to drive an extendable output rod thereof which is suitably joined at its distal end to the linkage bar 74 illustrated in FIG. 4. A suitable form of the secondary actuator 72 is an electrical screw actuator commercially available from Smith Aerospace, of Los Angeles, Calif.

The secondary actuator also includes an internal logic circuit 92 in the form of a solid state circuit board configured for controlling operation of the motor to extend and retract the output rod in response to commands received from the controller 88.

For example, a first inductive bridge 94 straddles the closed joint 62 and electrically joins the controller 88 to the secondary actuator 72 for selectively extending and retracting the linkage for opening and closing the flaps 56.

Correspondingly, second and third inductive bridges 96,98 also straddle the closed joint 62 for additionally joining the controller 88 to the variable nozzle for indicating when the flaps are opened or closed.

More specifically, a main sensor 100 is suitably mounted in the aft cowl for detecting when the flaps 56 are open, and is electrically joined in feedback control to the control circuit 92 of the secondary actuator 72. Similarly, an auxiliary sensor 102 is also suitably mounted in the aft cowl for detecting when the flaps 56 are closed, and is also electrically joined in feedback control to the control circuit 92 of the secondary actuator 72.

The second bridge 96 is electrically joined to the main sensor 100, and inductively joins the main sensor to the engine controller 88 across the closed joint 62 for determining when the flaps 56 are open. The third bridge 98 is electrically joined to the auxiliary sensor 102, and is also inductively joined to the controller across the closed joint 62 for determining when the flaps 56 are closed.

In this way, all of the power and control connections between the stationary forward cowl 58 and the translating aft cowl 60 may be inductively configured at the intercowl joint 62 without the need for physical electrical connection therebetween. The three bridges 94,96,98 are used for controlling operation of the secondary actuator 72, and therefore controlling operation of the variable nozzle, independently from the induction coupling effected between the primary and secondary coils 80,82 which merely provide power to drive the electrical motor of the secondary actuator.

The secondary actuator 72 and its feedback sensors 100, 102 may have any conventional configuration and operation for extending the output rod of the actuator and retracting the output rod with feedback control thereof. Such actuators are common in modern aircraft. However, the actuator is preferentially joined to the unison bar 74, cam follower 76, and cams 78 to selectively open and close the corresponding flaps 56 when desired for variable area operation of the nozzle.

In this way, the two sensors 100,102 may be used for monitoring open and closed positions of the variable nozzle at any suitable location of the movable components thereof. For example, the two sensors 100,102 may be conveniently located next to the output rod of the secondary actuator 72 as illustrated in FIG. 4 for detecting the presence or lack thereof of a target bracket joined to the distal end of the output rod. The target is aligned with either sensor depending upon the position of the output rod, which sensor correspondingly determines the position of the flaps 56 operatively joined to the output rod by the intervening linkage therebetween.

The two sensors 100,102 are operatively joined to the control circuit 92 of the actuator which permits accurate control of the flaps of the variable nozzle with conventional feedback from the monitored positions thereof.

The monitored positions of the flaps due to the two sensors 100,102 are inductively communicated or transmitted to the engine controller 88 in the forward cowl 58 by the corresponding second and third bridges 96,98 across the closed joint 62.

The engine controller 88 includes a conventional digital databus transmitter using conventional Aeronautical Radio Incorporated (ARINC) standards for transmitting to a visual indicator 104 in the aircraft cockpit whether the flaps of the variable nozzle are open or closed.

The main and auxiliary sensors 100,102 illustrated in FIG. 6 may be in the form of conventional proximity switches correspondingly electrically joined to the second and third bridges 96,98, and additionally electrically joined to the control circuit 92 of the secondary actuator 72. For example, each of the proximity switches 100,102 may be integrated, solid-state, double pole, double throw, switches having an internal induction coil driven by a DC square wave.

One type of this proximity switch is commercially available from the Couzet Company of Valence, France. The multiple poles or terminals of this proximity switch are illustrated schematically in FIG. 6, with the detection of a nearby target, such as the output rod of the secondary actuator, causing switching of the terminals therein.

As illustrated schematically in FIG. 6, each of the first, second, and third inductive bridges 94,96,98 includes a proximity switch 94a,96a,98a on one side of the joint 62, and a cooperating inductive target 94b,96b,98b on an opposite side of the joint for inductively activating the switches only when the joint is closed. The three bridges are suitably DC powered and can transmit inductive signals across the joint 62 only when closed with minimal spacing between the corresponding proximity switch and target, and not when the joint is open with the spacing therebetween being beyond the range of induction coupling.

More specifically, the components of the inductive bridges are illustrated schematically in FIG. 2 in exemplary locations along the splitline or joint 62, at which the primary and secondary coils 80,82 are also located. FIG. 6 illustrates schematically the electrical interconnection of the induction bridges into the control system.

The first induction bridge 94 includes a first proximity switch 94a mounted in the aft cowl 60 at the joint 62 and electrically joined to the power supply and control circuit of the secondary actuator 72. The first bridge also includes a first inductive target 94b mounted in the forward cowl 58 at the joint 62 adjacent to the first proximity switch 94a, and electrically joined to the controller 88.

Similarly, the second inductive bridge 96 includes a second proximity switch 96a mounted in the forward cowl 58 at the joint 62 and electrically joined to the controller 88. The second bridge also includes a second inductive target 96b mounted in the aft cowl 60 at the joint adjacent to the second proximity switch and electrically joined to the main sensor 100.

The third inductive bridge 98 includes a third proximity switch 98a mounted in the forward cowl 58 at the joint 62 and electrically joined to the controller 88. The third bridge also includes a third inductive target 98b mounted in the aft cowl 60 at the joint adjacent to the third proximity switch and electrically joined to the auxiliary sensor 102.

The first, second, and third proximity switches 94a,96a, 98a and the main and auxiliary proximity switches 100,102 are preferably identical to each other, and are commercially available double pole, double throw proximity switches which are DC powered. All six terminals of the proximity switches 100,102 are used for providing feedback to the control circuit 92, and status indication to the second and third inductive targets 96b,98b. The second and third proximity switches 96a,98a utilize only three of the available six terminals for communicating the open and closed status indication from the two sensors 100,102 to the cockpit indicator 104.

The first, second, and third inductive targets 94b,96b,98b illustrated in FIG. 6 preferably include inductive coils correspondingly electrically joined to the controller 88, main proximity switch 100, and auxiliary proximity switch 102 for being electrically powered thereby.

In operation, when the main actuator 70 illustrated in FIG. 6 is retracted to retract the aft cowl 60 in abutting contact with the forward cowl 58 the joint 62 is closed and the several inductive components are spaced sufficiently close together for inductively transmitting power and control signals across the closed joint 62. The primary coil 80 is energized for transmitting electrical power to the secondary coil 82 which in turn powers the secondary actuator 72.

The secondary actuator 72 is commanded to extend or retract its output rod by an internal switch in the controller 88 that selectively powers the first inductive target 94b. The output rod of the secondary actuator is initially retracted in normal operation and is commanded to extend by powering the first inductive target 94b.

The first proximity switch 94a detects the powered first target 94b and toggles the internal switch thereof to the extend position which then powers the electrical motor of the secondary actuator to extend in accordance with the control circuit 92.

When the secondary actuator is fully extended, the main sensor 100 detects the extended position of the output rod which opens the flaps, and toggles the internal switches to return an open signal to the control circuit 92 to stop the motor. The main sensor 100 also powers the second inductive target 96b when the flaps are open, which in turn toggles the internal switches of the second proximity switch 96a to send an open signal to the cockpit indicator 104.

The flaps may be closed by interrupting the power to the first inductive target 94b which in turn interrupts the inductive signal to the first proximity switch 94a which toggles the switch to its retract position and causes the control circuit 92 to reverse the direction of the motor for retracting the output rod of the secondary actuator. When the rod is fully retracted, the auxiliary sensor 102 detects the corresponding position of the output rod and toggles the proximity switch 102 to its closed position, which in turn powers the third inductive target 98b. The powered third target is detected by the third proximity switch 98a which is then toggled to its closed position sending a signal to the cockpit indicator 104 indicating that the flaps are closed.

The resulting control system illustrated in FIG. 6 is relatively simple and includes commercially available, conventional components, without the need for hard wiring across the intercowl joint 62. The primary coil 80 and corresponding elements of the three bridges may be conveniently hard wired in the fixed, forward cowl 58. The secondary coil 82 and corresponding components of the three bridges may be hard wired into the translatable aft cowl 60 in conjunction with the secondary actuator 72 and its feedback sensors 100,102.

Power and control signals are conveniently transmitted at the closed joint 62 by induction between the primary and secondary coils 80,82 and the corresponding components of the three bridges 94,96,98. When the aft cowl 60 is deployed aft by the main actuator 70, the open joint 62 is sufficiently large and outside the range of effective coupling between the coils and the cooperating components of the three bridges. The variable nozzle cannot be operated during thrust reversal operation of the engine, and may be operated only when the aft cowl is retracted closed against the forward cowl.

The turbofan aircraft engine illustrated in FIG. 1 may therefore include the variable area nozzle 38 in conjunction with the cascade-type thrust reverser 64 in the corresponding movable aft cowl 60 and fixed forward cowl 58. Power and control signals are conveniently provided to the variable nozzle by induction coupling between the two cowls without the need for hard wiring therebetween, or accommodating the requisite slack which would otherwise be required in electrical wires to accommodate displacement of the aft cowl relative to the forward cowl.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which we claim:

1. A turbofan nacelle comprising:
    a forward cowl adjoining an aft cowl at a joint, and including an exhaust duct having a main outlet at an aft end of said aft cowl for discharging exhaust;
    a variable nozzle selectively joined in flow communication with said exhaust duct, and including a secondary outlet surrounding said main outlet;
    a thrust reverser bridging said forward and aft cowls upstream from said variable nozzle;
    a primary transformer coil mounted in said forward cowl at said joint; and
    a secondary transformer coil mounted in said aft cowl at said joint adjacent to said primary coil for inductively receiving power therefrom, and operatively joined to said variable nozzle for providing power thereto.

2. A nacelle according to claim 1 further comprising:
    a main actuator mounted in said forward cowl and fixedly joined to said aft cowl for selectively extending aft said aft cowl to open said joint and expose said thrust reverser, and retracting forward said aft cowl to close said joint and cover said thrust reverser; and
    said primary and secondary coils adjoin each other at said closed joint for inductively transmitting power therebetween, and are spaced apart between said open joint for preventing inductive coupling therebetween.

3. A nacelle according to claim 2 wherein said variable nozzle comprises:
    a plurality of flaps pivotally mounted in said aft cowl to selectively cover and uncover a row of radial apertures extending through said exhaust duct upstream from said main outlet;
    deployment linkage operatively joined to said flaps to selectively open and close said flaps atop said apertures;
    a secondary actuator joined to said linkage to selectively pivot open and closed said flaps; and
    said secondary coil is joined to said secondary actuator for providing electrical power thereto.

4. A nacelle according to claim 3 further comprising:
    an electrical controller operatively joined to said main actuator for selectively extending and retracting said aft cowl for deploying and stowing said thrust reverser; and
    a first inductive bridge straddling said closed joint and electrically joining said controller to said secondary actuator for selectively deploying said linkage for opening and closing said flaps.

5. A nacelle according to claim 4 further comprising:
    a main sensor mounted in said aft cowl for detecting when said flaps are open, and joined in feedback control to said secondary actuator; and
    an auxiliary sensor mounted in said aft cowl for detecting when said flaps are closed, and joined in feedback control to said secondary actuator.

6. A nacelle according to claim 5 further comprising:
    a second inductive bridge straddling said closed joint and electrically joining said main sensor to said controller for determining when said flaps are open; and
    a third inductive bridge straddling said closed joint and electrically joining said auxiliary sensor to said controller for determining when said flaps are closed.

7. A nacelle according to claim 6 further comprising:
    an AC generator configured for generating AC voltage at a first frequency; and
    a frequency converter joining said generator to said primary coil, and configured for increasing frequency of said AC voltage to a second frequency greater than said first frequency to increase transmission efficiency between said primary and secondary coils.

8. A nacelle according to claim 6 wherein said main and auxiliary sensors comprise proximity switches correspondingly joined to said second and third inductive bridges, and additionally joined to said secondary actuator.

9. A nacelle according to claim 6 wherein said secondary actuator comprises:
    an electrical motor configured to drive an extendable output rod joined to said linkage; and
    an internal logic circuit for controlling said motor to extend and retract said rod in response to commands from said controller through said first bridge, and with feedback control in response from said main and auxiliary sensors.

10. A nacelle according to claim 6 wherein each of said first, second, and third inductive bridges comprises:
    a proximity switch on one side of said joint; and
    an inductive target on an opposite side of said joint for activating said switches only when said joint is closed.

11. A nacelle according to claim 10 wherein:
    said first inductive bridge comprises a first proximity switch mounted in said aft cowl at said joint and joined to said secondary actuator, and a first inductive target mounted in said forward cowl at said joint adjacent to said first proximity switch, and joined to said controller;
    said second inductive bridge comprises a second proximity switch mounted in said forward cowl at said joint and joined to said controller, and a second inductive target mounted in said aft cowl at said joint adjacent to said second proximity switch and joined to said main sensor; and
    said third inductive bridge comprises a third proximity switch mounted in said forward cowl at said joint and joined to said controller, and a third inductive target mounted in said aft cowl at said joint adjacent to said third proximity switch and joined to said auxiliary sensor.

12. A nacelle according to claim 11 wherein said first, second, third, main, and auxiliary proximity switches are identical to each other.

13. A nacelle according to claim 11 wherein said first, second, and third inductive targets comprise inductive coils correspondingly joined to said controller, main proximity switch, and auxiliary proximity switch for being powered thereby.

14. A nacelle according to claim 6 wherein:
    said deployment linkage comprises an arcuate unison bar mounted circumferentially around said duct, and including a plurality of cam followers spaced circumferentially apart in engagement with corresponding cams affixed to said flaps;
    said secondary actuator includes an extendable output rod joined to said unison bar for selectively rotating said bar in a first direction to pivot open said flaps, and in an opposite second direction to pivot closed said flaps to cover said apertures; and
    said main and auxiliary proximity switch are mounted in said aft cowl adjacent to said output rod of said secondary actuator for detecting extension and retraction thereof.

15. A nacelle according to claim 6 wherein said thrust reverser comprises:
    a grid of cascade vanes fixedly mounted to said forward cowl at said joint; and
    a row of blocker doors pivotally mounted to said aft cowl for deploying radially inwardly when said aft cowl is translated aft to open said joint and expose said cascade vanes for thrust reversal of said exhaust from said duct.

16. A turbofan nacelle comprising:
a forward cowl adjoining an aft cowl at a joint, and including an exhaust duct having a main outlet at an aft end of said aft cowl for discharging exhaust;
a variable nozzle selectively joined in flow communication with said exhaust duct, and including a secondary outlet surrounding said main outlet;
a thrust reverser bridging said forward and aft cowls upstream from said variable nozzle;
a main actuator mounted in said forward cowl and fixedly joined to said aft cowl for selectively extending aft said aft cowl to open said joint and expose said thrust reverser, and retracting forward said aft cowl to close said joint and cover said thrust reverser;
a secondary actuator mounted in said aft cowl to adjust said variable nozzle and selectively bypass exhaust from said duct to said secondary outlet; and
means for inductively powering said secondary actuator when said joint is closed, and being physically interrupted when said joint is open.

17. A nacelle according to claim 16 wherein said inductive powering means comprise:
a primary transformer coil mounted in said forward cowl at said joint;
a secondary transformer coil mounted in said aft cowl at said joint adjacent to said primary coil for inductively receiving power therefrom, and operatively joined to said secondary actuator for providing power thereto;
an electrical controller operatively joined to said main actuator for selectively extending and retracting said aft cowl for deploying and stowing said thrust reverser; and
a first inductive bridge straddling said closed joint and electrically joining said controller to said secondary actuator for selectively adjusting said variable nozzle.

18. A nacelle according to claim 17 wherein said variable nozzle comprises:
a plurality of flaps pivotally mounted in said aft cowl to selectively cover and uncover a row of radial apertures extending through said exhaust duct upstream from said main outlet;
deployment linkage operatively joined to said flaps to selectively open and close said flaps atop said apertures; and
said secondary actuator is joined to said linkage to selectively pivot open and closed said flaps.

19. A nacelle according to claim 18 further comprising:
a main sensor mounted in said aft cowl for detecting when said flaps are open, and joined in feedback control to said secondary actuator; and
an auxiliary sensor mounted in said aft cowl for detecting when said flaps are closed, and joined in feedback control to said secondary actuator.

20. A nacelle according to claim 19 further comprising:
a second inductive bridge straddling said closed joint and electrically joining said main sensor to said controller for determining when said flaps are open; and
a third inductive bridge straddling said closed joint and electrically joining said auxiliary sensor to said controller for determining when said flaps are closed.

21. A nacelle according to claim 20 wherein:
each of said first, second, and third inductive bridges comprises a proximity switch on one side of said joint, and an inductive target on an opposite side of said joint for activating said switches only when said joint is closed; and
said main and auxiliary sensors comprise proximity switches joined to corresponding ones of said inductive targets of said second and third inductive bridges.

22. A nacelle according to claim 21 wherein said secondary actuator comprises:
an electrical motor configured to drive an extendable output rod joined to said linkage; and
an internal logic circuit for controlling said motor to extend and retract said rod in response to commands from said controller through said proximity switch of said first bridge, and with feedback control in response from said main and auxiliary sensors.

23. A nacelle according to claim 22 wherein:
said first inductive bridge comprises a first proximity switch mounted in said aft cowl at said joint and joined to said secondary actuator, and a first inductive target mounted in said forward cowl at said joint adjacent to said first proximity switch, and joined to said controller;
said second inductive bridge comprises a second proximity switch mounted in said forward cowl at said joint and joined to said controller, and a second inductive target mounted in said aft cowl at said joint adjacent to said second proximity switch and joined to said main sensor; and
said third inductive bridge comprises a third proximity switch mounted in said forward cowl at said joint and joined to said controller, and a third inductive target mounted in said aft cowl at said joint adjacent to said third proximity switch and joined to said auxiliary sensor.

24. A nacelle according to claim 23 wherein said first, second, and third inductive targets comprise inductive coils correspondingly joined to said controller, main proximity switch, and auxiliary proximity switch for being powered thereby.

25. A method of powering a variable nozzle mounted in a translating aft cowl of a turbofan engine including a thrust reverser mounted at a joint with a forward cowl, said method comprising:
inductively powering said variable nozzle when said joint is closed; and
inductively uncoupling said variable nozzle from said forward cowl when said joint is open to operate said thrust reverser without operating said variable nozzle.

26. A method according to claim 25 further comprising inductively controlling said variable nozzle in an induction bridge between said forward and aft cowls independent of inductively powering said variable nozzle.

27. A method according to claim 26 further comprising:
monitoring open and closed positions of said variable nozzle;
controlling said variable nozzle with feedback from said monitored positions thereof; and
inductively transmitting said monitored positions to said forward cowl in corresponding induction bridges across said joint.

\* \* \* \* \*